UNITED STATES PATENT OFFICE 2,320,468

METHOD OF TREATING MERCURY CONTAMINATED SURFACES

Merle Randall, Berkeley, Calif.

No Drawing. Application March 26, 1942,
Serial No. 436,247

11 Claims. (Cl. 117—121)

This invention relates to a method of treating surfaces of rooms, furnace rooms, and other closed and semi-closed spaces, the walls of which have become contaminated with liquid metallic mercury.

An important object of my invention is to make it possible to decrease the health hazard in rooms, furnace rooms and other closed and semi-closed spaces, the walls of which are contaminated with liquid metallic mercury.

Another important object of my invention is to provide a process whereby the concentration of mercury vapor in rooms, furnace rooms, and closed and semi-closed spaces, the walls of which are contaminated with metallic mercury, may be conveniently reduced.

Another object of my invention is to provide such a process that is applicable under acid conditions as well as under the neutral or alkaline conditions, to which the process of my copending application Serial No. 399,417, filed June 23, 1941, is limited.

An important additional object of my invention is to provide a process for the treatment of mercury contaminated surfaces which cannot be treated by the process of my copending application No. 399,417 where because of aesthetic reasons a better appearance is desired than that resulting from that process.

Other objects and advantages of my invention will be evident from the following description.

In my copending application Serial No. 399,417, I disclose the method of treating mercury mines which comprises spraying the walls, muck piles, timbers, stopes, tunnels, and other parts of the mercury mine which are contaminated with free metallic mercury with a water solution of an alkali polysulfide. Certain additional materials which are valuable additions to the alkali polysulfide are also disclosed.

While the method disclosed in my aforesaid copending application is entirely satisfactory in the majority of mercury mines, some situations prevail where the mercury contaminated surfaces are acidic in nature, and under these conditions alkali polysulfides cannot be used because poisonous hydrogen sulfide would be formed. There are also other situations where for appearance or processing reasons a more permanent coating is desired, or where alkali polysulfide solutions are not allowable.

I have found that a coating containing a substantial amount of dissolved free sulfur or an excess of free elemental sulfur is satisfactory for the treatment of mercury contaminated surfaces, and that the health hazard in moderately ventilated rooms or closed spaces, the surfaces whereof are contaminated with metallic liquid mercury, and which have been so coated is satisfactorily reduced.

If the surface of a closed space is impregnated with liquid mercury then an increase in the rate of ventilation may not suffice to decrease the concentration of mercury vapor in the closed space below the allowable safe limit. However, if the large surface of the many small mercury droplets is coated over by a coating containing substantial amounts of dissolved sulfur or an excess of finely divided elementary sulfur, the rate of diffusion of mercury through the film into the air or gas coming in contact with the coating is very low and some mercury in the air or gas so coming in contact with the coating reacts with the sulfur thus forming harmless mercuric sulfide.

The dissolved sulfur may be dissolved in the vehicle of the coating or may be in the form of alkali polysulfide when acidic conditions are not encountered. The coating may be applied by spraying, brushing, or any other suitable means. A hand brush, a so-called air brush, a paint spray, a spray nozzle, or other similar means may be used.

Any coating containing substantial amounts of free sulfur in solution or in suspension is useful, but dissolved sulfur in the form of an alkali polysulfide should not be used if acid conditions are present.

In this specification and in the appended claims I have used the term "free sulfur" to include solid elemental sulfur and also elemental sulfur dissolved in a solvent.

One form of my invention comprises coating over the mercury contaminated surface by brushing by means of a hand brush with an oil paint containing substantial amounts of added wettable sulfur. The coating may also be applied by using a paint spray.

As an example of this form of my invention, ten per cent of finely divided sulfur is added to an oil paint and the same applied as a coating over the mercury contaminated surface.

There is a small vapor pressure over solutions containing substantial amounts of dissolved sulfur or over solid sulfur which assists in reducing the concentration of mercury in the space contained within the coated contaminated surfaces.

Another form of my invention which is adapted to be used in spaces other than mines and where the conditions are alkaline or neutral comprises coating over the mercury contaminated surface with a water solution of dissolved sulfur in the form of alkali polysulfide (sulfur dissolved in alkali hydroxide) which preferably contains wettable sulfur, wetting agents, and adhesives as disclosed in my copending application Serial No. 399,417.

Another form of my invention applicable to non-acid conditions comprises coating over the mercury contaminated surfaces with a coating of the calcimine or kalsomine type containing substantial amounts of colloidal or finely divided free sulfur.

As an example of this form of my invention the mercury contaminated surfaces are coated by spraying by means of a paint spray with a kalsomine paint containing ten per cent by weight of the kalsomine of finely divided sulfur added to the paint mix.

Another form of my invention comprises coating over the mercury contaminated surface with any form of coating and then dusting the surface with finely divided sulfur while the film is still in the tacky or sticky condition. The coating may or may not contain dissolved sulfur or added finely divided sulfur, but coatings containing such added elemental sulfur are preferred for dusting with finely divided sulfur. As an example of this form of my invention a mercury contaminated surface is coated by brushing with an oil paint, and then as the paint dries to the sticky condition finely divided elemental sulfur is dusted on with a dust gun such as is used for applying sulfur dust to plants for the control of plant pests. As another example of this form of my invention the mercury contaminated surface is coated over by spraying with an oil paint containing added elemental sulfur followed by blowing on finely divided sulfur carried in an air stream, such dusting on of the sulfur being done while the paint film is sticky and while the sulfur dust will adhere thereto.

For use in alkaline and neutral conditions, a preferred form of dissolved sulfur is the dissolved sulfur in calcium polysulfide.

Another form of my invention especially adaptable to the treatment of mercury contaminated mines with acidic conditions or other surfaces with acidic conditions comprises coating the surfaces with coatings containing the sulfur preferably dissolved in neutral or non-alkaline solvents.

Whether a solution of free sulfur in an alkaline solvent, in a neutral solvent, or in a non-alkaline solvent, an oil paint with substantial amounts of added sulfur, a coating with free sulfur dusted on, or any other embodiment of my invention, is to be used will depend largely upon the degree of acidity or alkalinity of the surface to be treated and upon the appearance desired and upon other practical requirements of the use to which the mercury contaminated surface to be treated is to be put. Such choice of the particular embodiment of my invention may be made by any operator reasonably skilled in the art.

The method of treatment with a coating containing free sulfur will avoid contamination of the contained space from the mercury contaminated surfaces, and will assist in reducing the mercury concentration in the closed space. With moderate ventilation the mercury concentration can be lowered to remove the health hazard. If the surface is exposed for periods of time to currents of air or gas containing mercury vapor above the saturation vapor pressure of mercury at the temperature of the surface, then the surface must be recoated to provide the maximum protection.

From the foregoing description, the uses, advantages, and operation of my invention will be readily understood by those skilled in the art to which the invention appertains. While I have described certain examples of my invention, I desire to have it understood that the examples given are merely illustrative, and that the invention is not to be limited to the details disclosed herein, but is to be accorded the full scope of the appended claims.

I claim:

1. A method of treating mercury contaminated surfaces comprising coating said surfaces with a composition containing free sulfur.

2. A method of treating mercury contaminated surfaces comprising coating said surfaces with a composition containing free sulfur in solution in the vehicle of the coating composition.

3. A method of treating mercury contaminated surfaces comprising coating said surfaces with a composition containing wettable sulfur.

4. A method of treating mercury contaminated surfaces comprising coating said surfaces with a coating composition and then dusting sulfur on said coating.

5. A method of treating mercury contaminated surfaces comprising coating said surfaces with an oil paint containing a substantial amount of free sulfur.

6. A method of treating mercury contaminated surfaces comprising coating said surfaces with a coating composition, and then adding finely divided sulfur to said coating while said coating is still in the adhesive condition.

7. A method of treating mercury contaminated surfaces comprising coating said surfaces with an oil paint containing a substantial amount of free finely divided sulfur.

8. A method of treating mercury contaminated surfaces comprising coating said surfaces with a coating of the kalsomine type containing an excess of finely divided sulfur.

9. A method of treating mercury contaminated surfaces suitable for use in non-acid conditions comprising coating said surfaces with a composition containing substantial amounts of free sulfur dissolved in an alkaline solvent.

10. A method of treating mercury contaminated surfaces suitable for use in non-acid conditions comprising coating said surfaces with a composition containing substantial amounts of free sulfur dissolved in calcium hydroxide.

11. A method of treating mercury contaminated surfaces comprising coating said surfaces with a coating composition containing elemental sulfur, and then dusting finely divided sulfur on said coating while said coating is still in the adhesive condition.

MERLE RANDALL.